United States Patent [19]

Miller et al.

[11] Patent Number: 5,125,301

[45] Date of Patent: Jun. 30, 1992

[54] SYSTEM FOR AUTOMATICALLY POSITIONING MULTIPLE TOOL-HOLDING CARRIAGES

[75] Inventors: William R. Miller, Portland, Oreg.; Earl A. Sexton, Jr., Camas, Wash.

[73] Assignee: Tidland Corporation, Camas, Wash.

[21] Appl. No.: 202,974

[22] Filed: Jun. 3, 1988

[51] Int. Cl.$^5$ ............................ B26D 1/18; B26D 1/24
[52] U.S. Cl. ............................................ 83/13; 83/499; 83/76.1; 83/76.7; 83/425.4
[58] Field of Search ................... 83/44, 51, 56, 425.4, 83/433, 434, 471.1, 498, 499, 500, 504, 508.2, 508.3, 13, 76.1, 76.7

[56] References Cited

U.S. PATENT DOCUMENTS

| | | | |
|---|---|---|---|
| 1,650,613 | 11/1927 | Dorman | 83/498 |
| 1,738,145 | 12/1929 | Hulbert | 83/508.3 |
| 3,176,566 | 4/1965 | Patterson, Jr. | 83/498 |
| 3,470,776 | 10/1969 | Brichard et al. | 83/433 |
| 3,540,340 | 11/1970 | Koskela et al. | 83/499 |
| 3,786,705 | 1/1974 | Dorfel | 83/504 |
| 3,834,258 | 9/1974 | Zumstein | 83/425.4 |
| 3,857,315 | 12/1974 | Andersson | 83/425.4 |
| 3,882,764 | 5/1975 | Johnson | 83/499 |
| 3,886,833 | 6/1975 | Gunn et al. | 83/504 |
| 4,125,076 | 11/1978 | Dörfel et al. | 83/499 |
| 4,188,846 | 2/1980 | Jones et al. | 83/499 |
| 4,261,239 | 4/1981 | Toboshi et al. | 83/499 |
| 4,516,454 | 5/1985 | Mosburger | 83/425.4 |
| 4,592,259 | 6/1986 | Görner et al. | 83/13 |
| 4,649,782 | 3/1987 | Cavagna | 83/425.4 |
| 4,730,110 | 3/1988 | Spaulding | 250/231 SE |

FOREIGN PATENT DOCUMENTS

3426302C1 2/1986 Fed. Rep. of Germany .
2072563 10/1981 United Kingdom .

*Primary Examiner*—Hien H. Phan
*Attorney, Agent, or Firm*—Chernoff, Vilhauer, McClung & Stenzel

[57] ABSTRACT

A system for automatically positioning a plurality of tool-holding carriages along an elongate guide member utilizes a single drive member to move all of the carriages simultaneously. The carriages each have clutches for selectively engaging or disengaging the drive member so that the carriages can be moved relative to each other by the drive member, and can be moved simultaneously in opposite directions along the guide member if desired. The drive member is capable of moving each carriage throughout its respective maximum range of movement with a continuous motion, without any reversal of the drive member or any disengagement of the respective carriage from the drive member. Each carriage has an electrically-powered position sensor capable of transmitting different discrete signals for different positions of the carriage so that it provides absolute indications of position rather than indications which are relative to some reference position. A sealing enclosure surrounds both the drive member and the carriages, so as to prevent the entry into the enclosure of airborne particles, and likewise surrounds all fluid and electrical power conduits to the carriages. Automatic positioning of the various carriages is simplified by precisely positioning them sequentially, in an order corresponding to progressively larger distances of movement required for each carriage to reach its desired position.

1 Claim, 8 Drawing Sheets

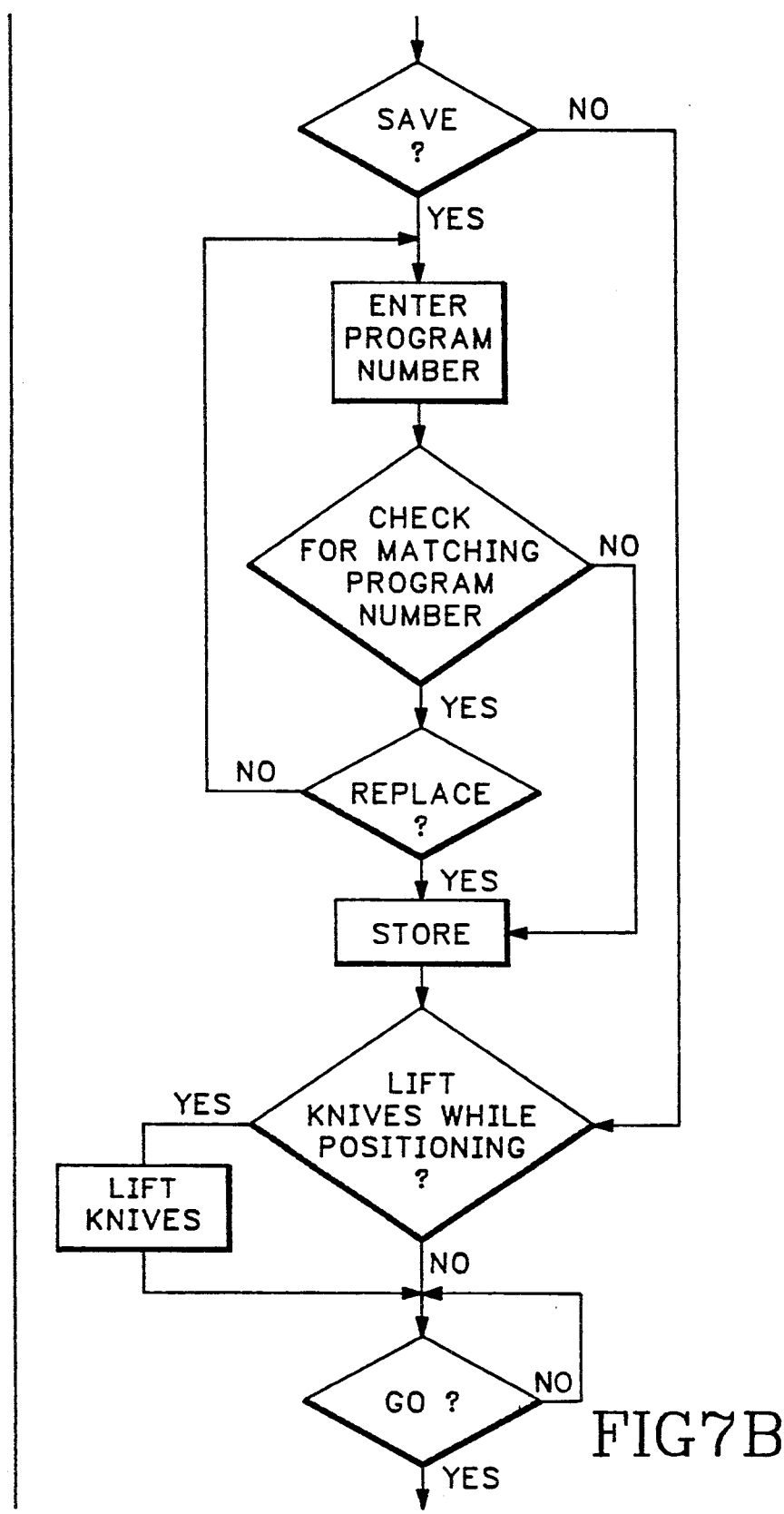

SYSTEM FOR AUTOMATICALLY POSITIONING MULTIPLE TOOL-HOLDING CARRIAGES

BACKGROUND OF THE INVENTION

This invention relates to a system for automatically positioning a plurality of tool-holding carriages relative to each other along an elongate guide member. More particularly, the invention relates to, but is not limited to, the positioning of carriages of the type which hold shearing, scoring or creasing tools in an array transverse to a longitudinally-moving web of paper, or which hold any other tools or instruments requiring variable placement with respect to a material or object.

One type of automatic system used in the past for positioning an array of tool-holding carriages employs an individual positioning motor on each carriage, as exemplified by the systems shown in U.S. Pat. Nos. 3,176,566 and 4,649,782, and British patent No. 2,072,563. The requirement for a separate positioning motor on each carriage, however, adds significantly to the expense, complexity of control, and maintenance requirements of the system, and limits the amount of power available to move each carriage.

Another previous type of automatic positioning system employs a single motorized drive for positioning a plurality of tool-holding carriages with respect to each other. Exemplary of this category of systems are those shown in U.S. Pat. Nos. 3,540,340, 3,834,258, 3,882,764, 4,125,076, 4,188,846, 4,261,239 and 4,592,259. These utilize drive members, consisting of elongate screws, sliding bars and the like, capable of moving all of the carriages simultaneously and positioning each carriage by selective engagement and disengagement of the carriage relative to the drive member. However, all of these systems have significant deficiencies with respect to their speed and accuracy of positioning, adversely affecting their productivity and reliability. In most of these systems, the limitation on speed is a result of the inability of the drive member to move the respective carriages bidirectionally simultaneously when repositioning them. Rather, all carriages must usually be moved first in one direction to position some of them, and thereafter in the opposite direction to position the remainder, requiring a time-consuming multi-step process. Even a system such as that shown in U.S. Pat. No. 4,125,076, which utilizes upper and lower reciprocating sliding bars moving in opposite directions to move the carriages bidirectionally simultaneously, cannot provide an improvement in speed because the positioning motion is intermittent rather than continuous due to the reciprocating action of the bars. Moreover, the multiple clutch engagements and disengagements necessary to move a carriage in a single direction by means of a reciprocating drive member can cause significant accumulated positioning errors, as well as excessive wear on the system.

Another limiting factor of all prior automatic systems, affecting both speed and accuracy, is the employment of pulse-counting position sensors for indicating the position of each carriage. Such position sensors, as shown for example in U.S. Pat. No. 3,540,340, indicate carriage position only relative to a reference or "home" position by counting pulses as the carriage moves relative to the reference position. Such pulses can be skipped or missed by a counter, thereby adversely affecting accuracy. Moreover, if power is interrupted for any reason, the stored pulse counts of all of the position sensors are lost, requiring time-consuming return of all of the carriages to the reference position for recalibration of the position sensors before positioning can be determined or repositioning can occur.

A further problem of prior automatic systems adversely affecting their accuracy involves the design of their brake structures, by which each carriage is locked to the guide member to maintain it in proper position. Such brakes normally comprise carriage-mounted brake shoes or pads, or comparable frictional engagement members, which extend slidably into contact with a surface of the guide member in a direction transverse to the positioning direction when the brake is actuated. The slidable interconnection of the engagement member with its carriage, which permits the transverse extending motion, creates a loose tolerance between the engagement member and carriage in the direction of positioning. This in turn permits a degree of latitude in carriage position relative to the engagement member, permitting the carriage to assume slightly different positions within a limited range, rather than a single precise position, when the brake is engaged.

Slitting knives and similar implements for cutting moving web material such as paper produce a substantial amount of particulate matter in the air surrounding the carriages and the guide member. In most prior automatic positioning systems, the mating surfaces interconnecting the carriages with the guide member and drive member, respectively, are exposed to these particles which allows them to clog and abrade the precisely-machined mating surfaces, impeding movement and causing wear. On occasion, foldable bellows-type covers have been used between the carriages in an attempt to protect these surfaces from exposure to particles, but such covers prevent the positioning of the respective carriages in close proximity to each other, and also require substantial maintenance to keep them in good repair.

All of the previous automatic systems have electrical and pneumatic conduits leading to the respective carriages which, because of the movability of the carriages, present a substantial problem of conduit control to avoid excessive wear, kinking, and exposure of the conduits to external hazards. Moreover, the space required to accommodate the guide member, its respective carriages and multiple moving conduits is usually excessively large, making installation difficult and interfering with the space requirements of the associated web-handling equipment.

Where upper and lower single-drive automatic positioning systems are employed on the top and bottom sides of the web material, the space problem is aggravated further by the fact that the upper and lower drive systems are mechanically interconnected so as to be driven in synchronization by a single motor, as exemplified by the systems shown in U.S. Pat. Nos. 3,540,340, 3,882,764, 4,188,846, 4,261,239, and 4,592,259. Furthermore, such interconnection of the two drive members makes maintenance and replacement of the respective upper and lower drive members, and variation of their positional relationship to each other, more difficult since they are not mechanically independent.

Finally, the manner in which previous automatic systems precisely position the multiple carriages in an automatic fashion has required both wasted motion and highly complex computer software to ensure that the respective carriages do not obstruct each other's movements during the positioning process, detracting from speed as well as reliability.

SUMMARY OF THE INVENTION

The present invention is directed to an automatic multicarriage positioning system having features which solve all of the aforementioned problems. High positioning speed, accompanied by a high degree of positioning accuracy, is provided by a drive member which moves with a nonreciprocating motion and which, nevertheless, is capable of moving the carriages bidirectionally simultaneously. The drive member may comprise a motor-driven, endless, flexible tension member driven by drums or sprockets and having two parallel portions moving nonreciprocatively in opposite directions, each portion selectively engageable and disengageable by any of the carriages. Alternatively, the drive member could take many other forms, such as a unidirectionally-rotating smooth rod selectively engageable by either of a pair of oppositely-tilting bearings on each carriage, or a pair of oppositely-turning or oppositely-pitched parallel elongate screws, either of which is selectively engageable by a respective carriage. In any case, the drive member or members are not reciprocative and therefore do not require multiple engagements and disengagements to move a carriage in any particular direction. Rather, the drive members are capable of moving each carriage with a nonreciprocating motion throughout its maximum range of movement.

Accuracy and speed of the system are further enhanced by the use of electrically-powered position sensors on each of the carriages for indicating the positions of each carriage along the guide member absolutely, without need of any reference or "home" position. Such position sensors transmit different discrete signals for different positions of each carriage and therefore, if the system is de-energized for any reason, can immediately indicate all carriage positions upon re-energizing of the system without the need to move the carriages first to a reference position for recalibration. Such a position-sensing system is also not susceptible to miscounting of pulses.

Positioning accuracy is also improved by a brake system which, although including a carriage-mounted actuating member which moves transversely to the positioning direction as in the prior art, employs a unique frictional engagement member interposed between the actuating member and the guide member which prevents any relative movement between the carriage and the engagement member in the positioning direction. This enables the carriage to maintain a single, precise position relative to the guide member when the brake is applied.

Protection of the mating engagement surfaces interconnecting the carriage with the guide member and drive member, respectively, to avoid their exposure to airborne particulate matter, is accomplished by an enclosure which surrounds both the drive apparatus and the carriages while nevertheless permitting the carriages to support their knives or other tools in positions exterior of the enclosure. The enclosure is preferably slightly pressurized to impede the entry of any dust particles therein.

The same enclosure also encloses the electrical and fluid-power conduits leading to each carriage to protect them. The conduits are compactly provided as a series of longitudinally-overlapping ribbon cables having transversely-spaced parallel portions nestable within each other extending longitudinally along the guide member.

When the system of the present invention is used to position upper and lower arrays of carriages, upper and lower drive members are used to position the respective carriages. However, rather than being mechanically coupled together as in prior systems, the upper and lower drive members are driven by separately-powered upper and lower motors which drive the members independently. Synchronization of the upper and lower systems is nevertheless maintained by feedback from the carriage position sensors and resultant control of each carriage's drive-member engagement clutches.

Greater simplicity and reliability of the positioning system, as well as a further improvement in speed, are provided by a positioning method which, although moving all of the carriages toward their respective predetermined target positions simultaneously, precisely positions the carriages in a sequential order dependent upon the distance by which each carriage must be moved to attain its particular target position, the order being progressively from the least distance to the largest distance.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIGS. 7A, 7B and 7C are a simplified logic flow diagram in accordance with which the controller of the system is programmed to position the various carriages.

DESCRIPTION OF THE PREFERRED EMBODIMENT

Figure 1:
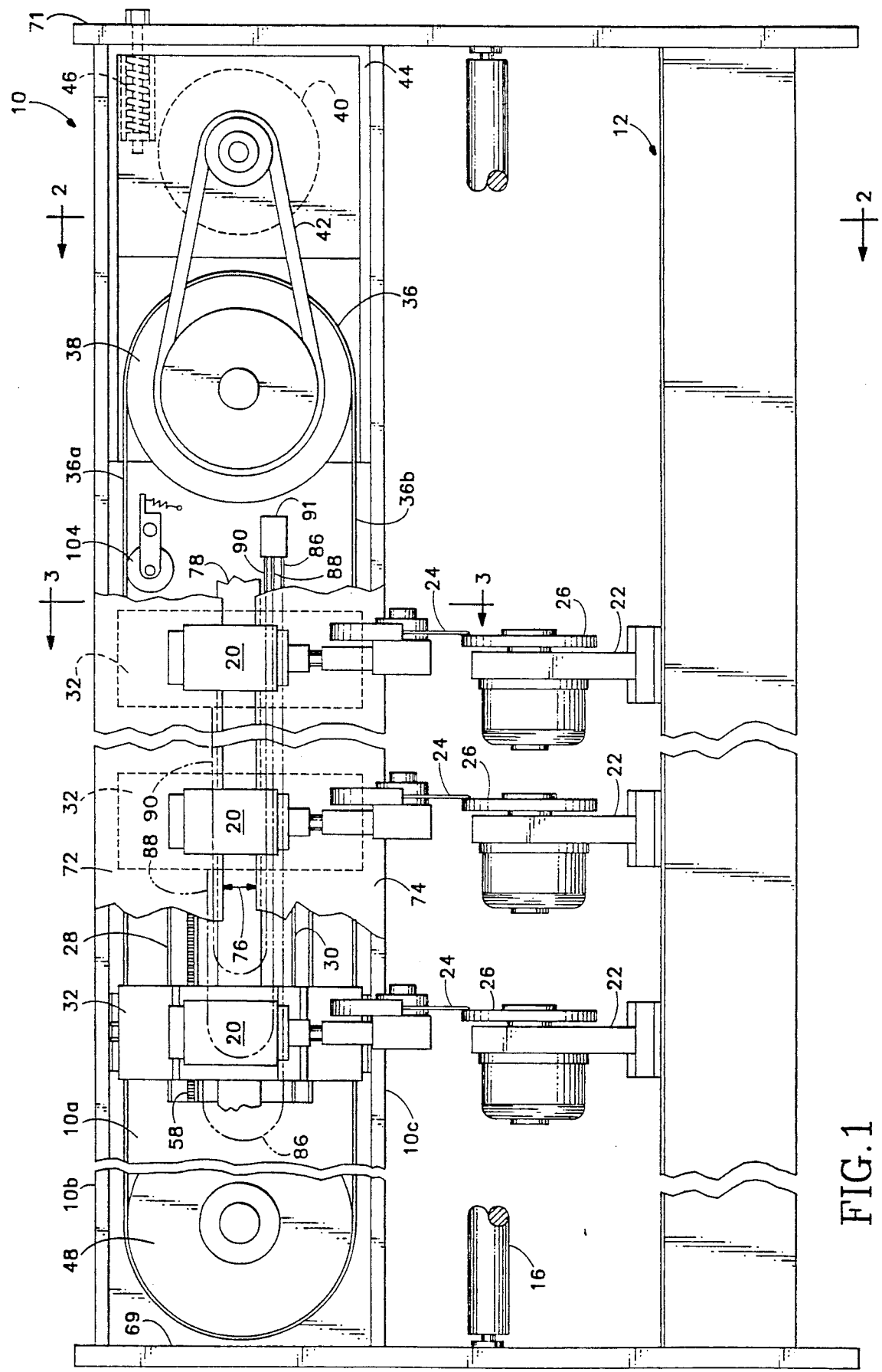
FIG. 1 is an extended front view of an exemplary embodiment of the system of the present invention, with portions broken away to show underlying structure.
Figure 2:
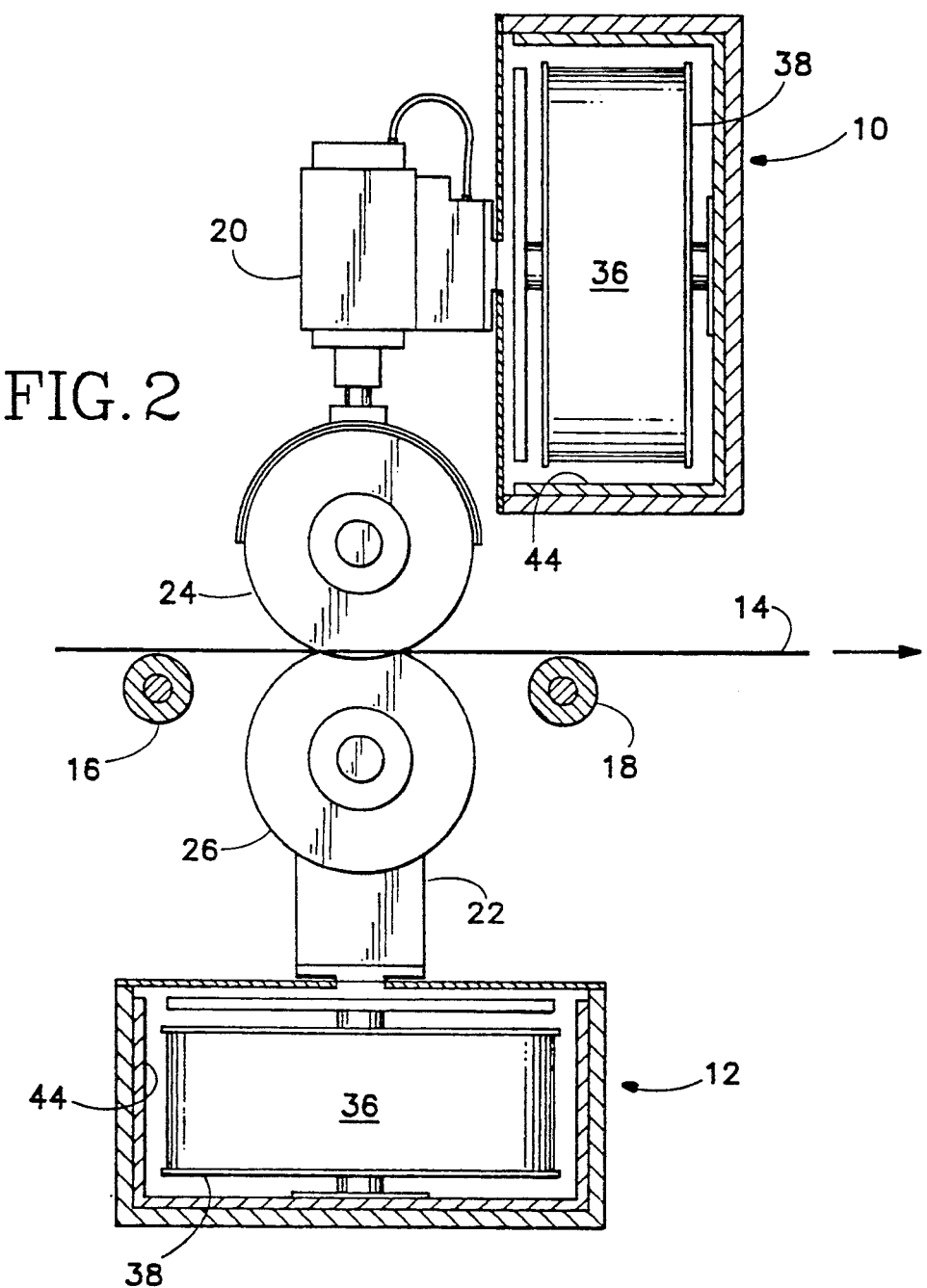
FIG. 2 is a partially sectional, simplified view taken along line 2—2 of FIG. 1.

With reference to FIGS. 1 and 2, an exemplary embodiment of a system in accordance with the present invention comprises elongate, channel-shaped upper and lower guide members 10 and 12, respectively, between which a continuous sheet of web material 14 (FIG. 2) moves longitudinally supported by elongate rollers 16 and 18. Mounted on the guide members 10 and 12 are transversely-spaced arrays of upper tools 20 and lower tools 22 which, for exemplary purposes, comprise holders for respective rotary shearing knife pairs 24, 26 for cutting the web material 14 into longitudinal strips of predetermined width depending upon the spacing of the tools 20, 22 along the guide members. Alternatively, other types of tools such as scoring knives, creasing tools, scanners, robotic tools and the like could be mounted on the guide members 10 and 12. It is sufficient to employ merely a single guide member when transverse positioning of only a single array of tools is necessary for a particular operation.

Figure 3:
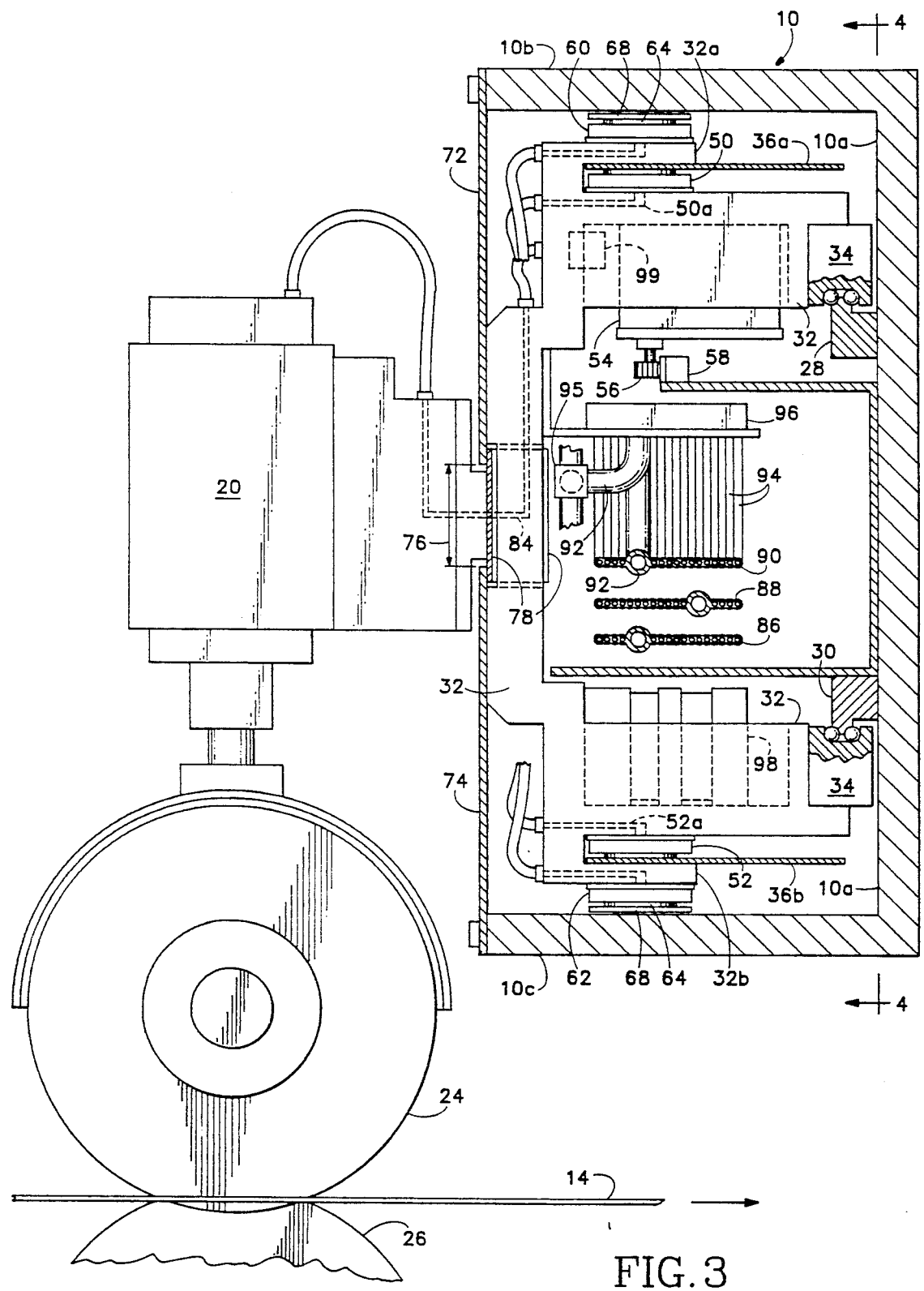
FIG. 3 is an enlarged detailed sectional view taken along line 3—3 of FIG. 1.
Figure 4:
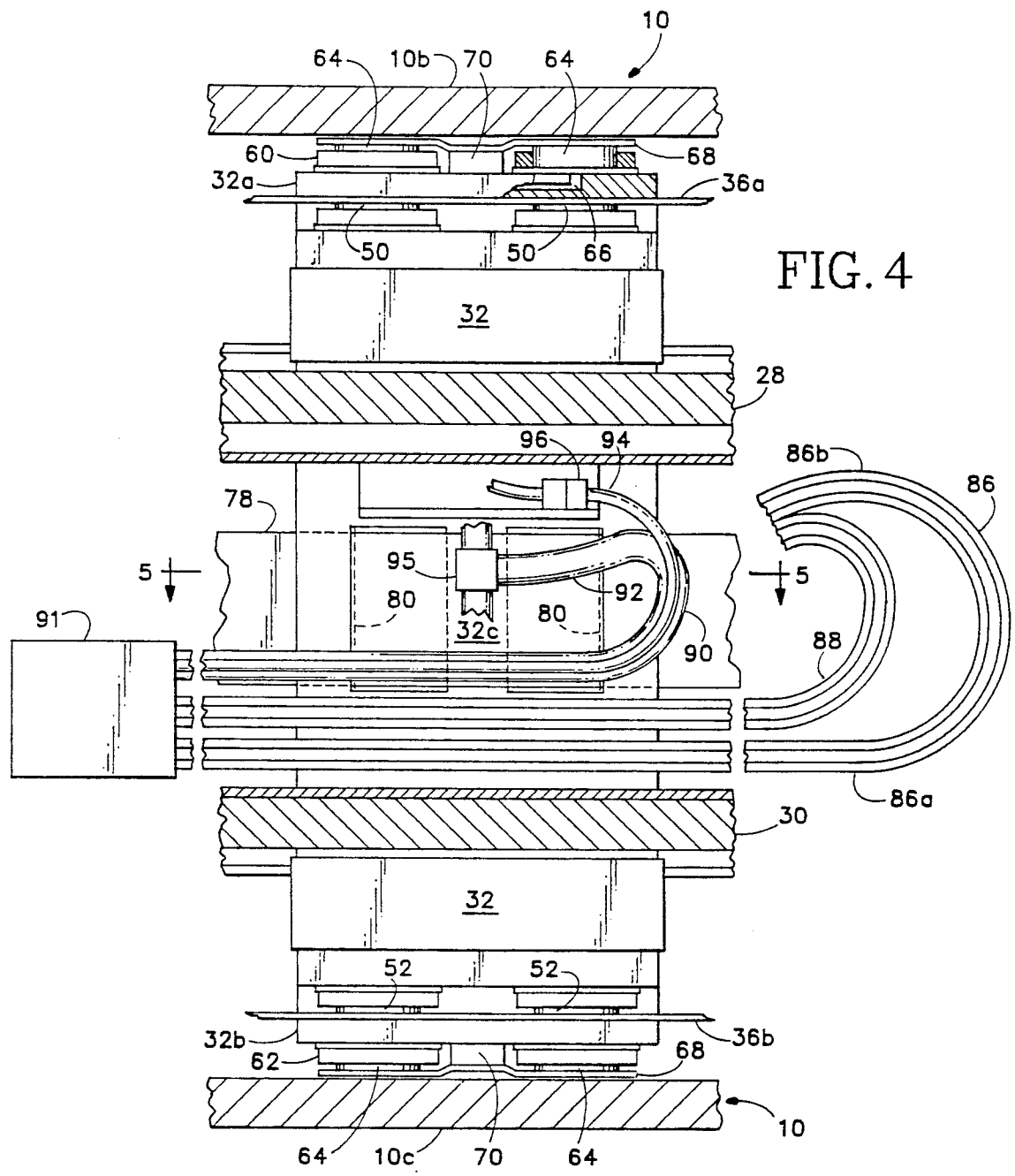
FIG. 4 is a partial rear sectional view taken along line 4—4 of FIG. 3.

The description of the guide members and their respective positioning structures will be with respect to the upper guide member 10 only, the lower guide member 12 being substantially identical although oriented about its longitudinal axis at an angle to the upper guide member 10. With reference primarily to FIGS. 1 and 3, the rear wall 10a of the guide member 10 includes upper and lower elongate rails 28 and 30 supporting a transversely-spaced array of generally C-shaped carriages 32 by their engagement with upper and lower linear roller bearings 34 mounted on each carriage 32, thereby permitting movement of the respective carriages along the longitudinal axis of the guide member 10. Selective movement of the carriages 32 is accomplished by means of a flexible, endless steel drive band 36 driven unidirectionally by a drive drum 38 which is in turn driven by a motor 40 through a belt 42. The drum 38 and motor 40 are preferably mounted on a carrier 44 capable of limited longitudinal movement relative to the guide member 10 in response to any imbalance between the tension on the band 36 and the opposing force of an adjustable coil spring 46. An idler drum 48 for the band 36 is rotatably mounted to the guide member 10 at the opposite end thereof. The band 36 has a pair of transversely-spaced, oppositely-moving, parallel portions comprising upper portion 36a and lower portion 36b. With reference also to FIG. 4, the upper band portion 36a is selectively engageable and disengageable by each carriage 32 in response to the activation or deactivation, respectively, of an upper clutch assembly 50. In response to pneumatic actuating pressure in clutch control conduit 50a due to activation of solenoid valve 50b (FIG. 6), the clutch assembly clamps the band between the clutch pads and a band-engagement member 32a on the carriage which, in cooperation with the clutch assembly 50, forms an openable and closable band-engaging caliper. Conversely, relief of pneumatic pressure in conduit 50a in response to deactivation of valve 50b retracts the clutch pads opening a gap between the clutch assembly and the member 32a through which the band can slide freely. Similarly, the bottom portion 36b of the band 36 is selectively engageable and disengageable by a lower clutch assembly 52 in response to pressure, or relief of pressure, in pneumatic conduit 52a caused by activation or deactivation of solenoid valve 52b (FIG. 6), the clutch pads interacting with carriage portion 32b to form a band-engaging caliper assembly similar to the upper one. Thus, with the band 36 driven unidirectionally with a continuous motion, simultaneous activation of the clutch assemblies 50 of any of the carriages 32 to engage the upper portion 36a of the band will move such carriages in the same direction simultaneously. Conversely, simultaneous activation of the bottom clutch assemblies 52 of any of the carriages to engage the bottom portion 36b of the band will move such carriages in the opposite direction simultaneously. Of course, while one clutch assembly of a particular carriage engages one portion of the band, the other clutch assembly of the same carriage must be disengaged to permit the other portion of the band to move freely through the caliper assembly. The clutch assemblies 50 and 52 of each carriage 32 are controlled independently such that one carriage may engage the upper portion 36a of the band while another carriage simultaneously engages the bottom portion 36b, thereby moving both carriages simultaneously in opposite directions. If a plurality of carriages engage the band 36, they may all be moved simultaneously, some in one direction and some in the opposite direction depending upon the new positions to which they are to be moved. Each carriage is movable in either direction throughout its maximum range of movement with a continuous motion requiring no intermittent clutch engagements and disengagements to move from one position to any other position.

Each carriage 32 is equipped with an electrically-powered position sensor 54 having a pinion 56 which rotatably engages a toothed rack 58 mounted on the guide member 10. Although the individual carriage position sensors may be of the pulse-counting, rotary encoder type, the preferable type of position sensor employed is an absolute one which, instead of counting pulses from a reference position, generates a respective discrete signal for each different position of the carriage 32 throughout its maximum range of motion along the guide member 10. Such position sensors are known, as shown for example in U.S. Pat. No. 4,730,110 incorporated herein by reference.

Whenever both clutch assemblies of any carriage 32 are disengaged from the band 36, the carriage is locked to the guide member 10 by means of upper and lower brake assemblies 60 and 62 which engage the upper and lower walls 10b, 10c of the guide member. Each of the upper and lower brake assemblies 60 and 62, respectively, comprises a pair of actuating members 64 which are extensible, in response to pressure in pneumatic actuating conduit 66 caused by activation of solenoid valve 66b (FIG. 6), in a direction substantially transverse to the direction of movement of the carriage 32 along the guide member 10. The actuating members 64 do not directly engage the guide member 10; instead, an engagement member 68 of yieldable spring steel is interposed between the brake-actuating members 64 and the guide member 10. The central portion of each engagement member 68 is fixedly anchored to the carriage 32 by a respective connecting block 70 (FIG. 4) so that its movement relative to the carriage longitudinally of the guide member 10 is prevented, even though its yieldability permits its ends to move transversely relative to the carriage in response to the brake actuating members 64. Thus, the looseness of the actuating members 64, necessary to permit their transverse extension and retraction relative to the carriage, does not result in a corresponding looseness of the carriage relative to the guide member 10 when the brake assemblies are actuated. Therefore, the carriages 32 maintain precise positions relative to the guide member with the brakes applied.

Figure 5:
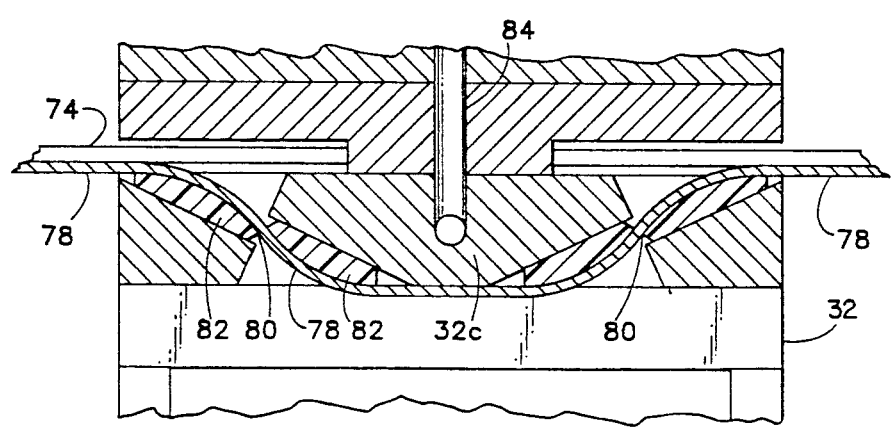
FIG. 5 is a partial top sectional view taken along line 5—5 of FIG. 4.

The ends of the guide member 10 are covered by upright members 69 and 71, while the front is covered by an upper cover plate 72 and a lower cover plate 74, extending longitudinally along the entire length of the guide member, with a central longitudinal gap 76 therebetween. On the rear side of the gap 76, within the enclosure formed by the guide member 10, is a thin flexible steel sealing band 78 which closes the gap 76, overlapping the gap's upper and lower edges. The purpose of the sealing band 78 is to complete the guide member enclosure, which surounds the carriages 32, the drive member 36 and the respective clutch and brake assemblies on each carriage, so as to prevent the entry into the enclosure of airborne particles. Nevertheless, the sealing band 78 must permit each carriage 32 to support a respective tool such as 20 or 22 exterior of the enclosure. With reference particularly to FIGS. 3, 4 and 5, the front face of each carriage 32 has a pair of vertical slits 80 formed therein through which the band 78 is slidably woven between the front and rear of the carriage face in a conventional manner similar to that used on rodless fluid power cylinders. The band 78 is fixed to the guide member 10 at both ends so that it does not move longitudinally. Therefore, as the carriage moves longitudinally relative to the guide member, the band 78 slides matingly through the slits 80 maintaining its sealing abutment with the upper and lower cover plates 72 and 74 except where it passes through the slits 80 behind the face of each carriage. The slits 80 are formed by bushings 82 so as to minimize their clearance with respect to the band 78, thereby preventing the entry of particulate matter through the slits 80 into the interior of the guide member enclosure. Support of the exterior tool is accomplished by the central portion 32c of the front face of the carriage, which is connected to the remainder of the carriage by communication therewith at the top and bottom of the slits. Since it is necessary in most circumstances to supply fluid power to the exterior tool, the central portion 32c of the carriage face is likewise utilized to provide a fluid conduit 84 which, in the exemplary embodiment shown in the figures, is used to extend or retract the upper knife 24 vertically, and also to move it axially with respect to its mating lower knife 26 in a known manner. If desired, in order to maximize the seal between the band 78 and the front cover plates 72 and 74, the cover plates may be permanently magnetized so as to attract the band 78. Although other sealing structures, such as resilient flaps or gaskets of rubber or the like, could be used in place of the steel band 78, the band 78 is preferable because it is significantly more wear-resistant than other possible alternative structures. Preferably, the interior of the guide member enclosure is slightly pressurized by air supplied from the pneumatic power system so as to further discourage the entry of any particulate matter into the enclosure.

Fluid and electrical power for each carriage 32 is supplied through respective flexible hybrid ribbon cables such as 86, 88 and 90 which communicate between the interior and the exterior of the guide member enclosure through a junction assembly 91 fastened to the rear wall 10a of the guide member 10, such assembly including electrical plugs and recepticles and a pneumatic quick-disconnect coupling. Such junction assembly may also serve as the source of pressurized air within the enclosure. The number of ribbon cables is dependent upon the number of carriages 32 to be served by the cables. As best seen in FIGS. 3 and 4, each ribbon cable includes a fluid power conduit 92 flanked by arrays of electrical conduits 94. The electrical conduits of each cable connect to a respective junction block 96 on each carriage 32, while the fluid power conduit 92 connects by a tee 95 to other conduits which communicate through internal porting in the carriage (not shown) with a lower solenoid valve assembly 98 (FIG. 3), containing valves 50b, 52b and 66b for controlling the brake and clutch assemblies, and an upper solenoid valve 99 for controlling the tool 20 through conduit 84. These valves are regulated by signals transmitted through the electrical conduits 94. As shown in FIGS. 1 and 4, each of the cables 86, 88 and 90 has respective lower and upper portions, such as 86a and 86b of cable 86, extending in spaced parallel relation in opposite directions longitudinally of the guide member 10. Moreover, the cables 86, 88 and 90 are nested in such a way that their respective lower portions are arranged in one vertical order and their respective upper portions are arranged in the opposite vertical order so that both portions of cable 90 nest between the corresponding portions of cable 88, and both portions of cable 88 similarly nest between the portions of cable 86. The fluid power conduits 92 are offset in alternating opposite directions from the respective centerlines of the ribbon cables as shown in FIG. 3 to maintain the desired compact resting relationship of the cables relative to each other. Each carriage 32 has an opening extending longitudinally therethrough, defined by its rearwardly-opening C-shaped cross section, which permits passage of both the upper and lower portions of the nested ribbon cables through the respective carriages longitudinally of the guide member, to provide an extremely compact, protected arrangement maintaining the cables free of external hazards.

Figure 6:
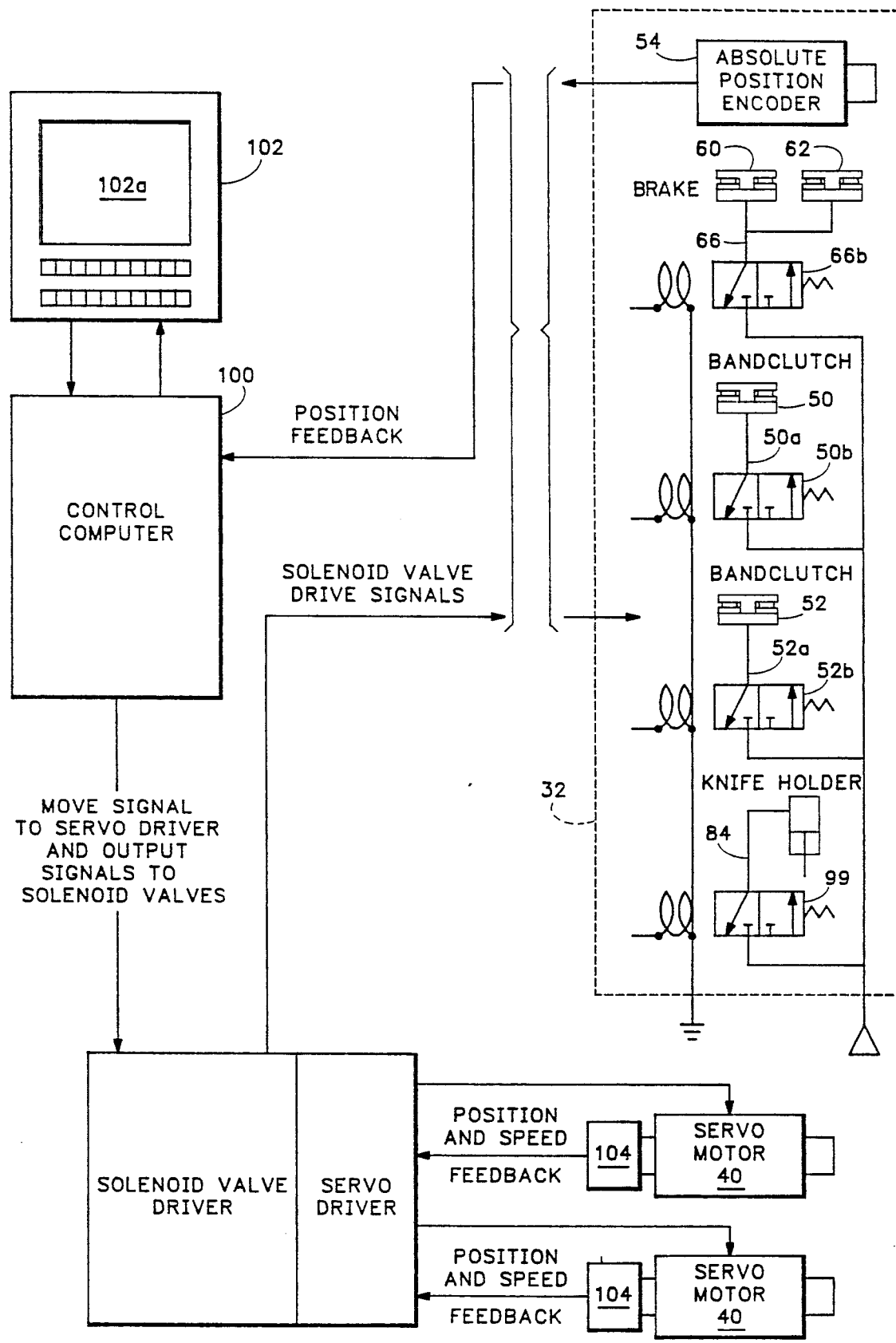
FIG. 6 is a simplified electrical and pneumatic circuit diagram for the system of FIG. 1.

With reference to FIG. 6, operation of the system is controlled by a conventional microcomputer-based controller 100 which receives operator command inputs from a terminal 102 and transmits variable information regarding the system to the terminal's display screen 102a. The controller also receives inputs from various sensors and transducers employed in the system, most notably the respective carriage position sensors 54, and the rotary encoders 104 which sense the speed and distance traveled by the bands 36 by means of the encoders' connections either directly to the bands, as shown in FIG. 1, or to the rotary shafts of the drive motors 40. In response to these inputs, the controller regulates separately the operation of the various solenoid valves on each carriage 32 (the valves of only one carriage being shown in FIG. 6) which control the brake and clutch assemblies and the tool associated with the carriage. The controller also regulates the activation and deactivation of a pair of separate electric motors 40, one associated with the upper guide member 10 and the other associated with the lower guide member 12 for driving the respective drive bands 36. No driving interconnection between the respective drive motors 40 is necessary even though the movement of the upper tools 20 and lower tools 22 must be synchronized, because the synchronization of the upper and lower tools is accomplished by the controller in its regulation of the upper and lower motors 40 and the respective brake assemblies and clutch assemblies of the carriages.

Figure 7A:
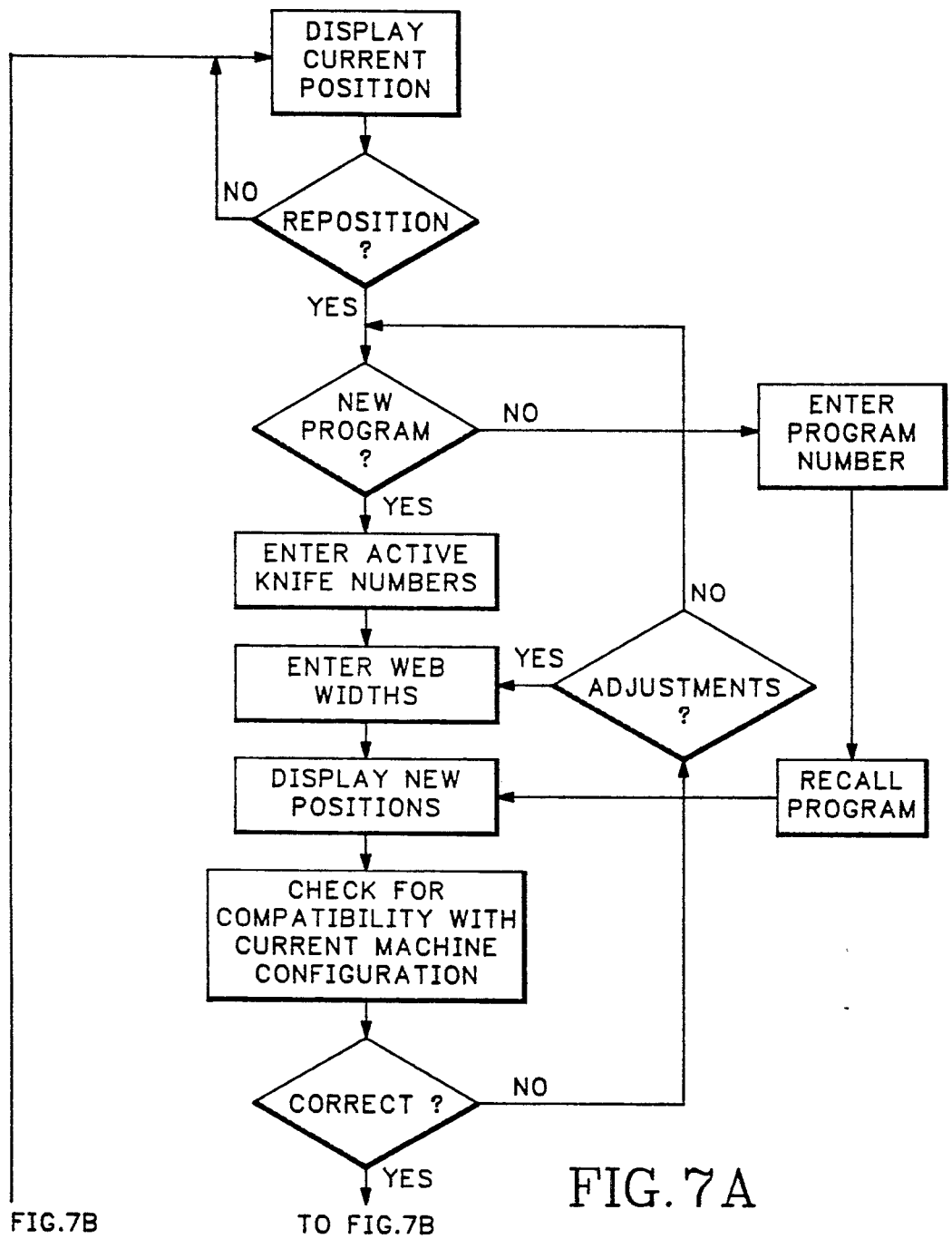
Figure 7C:
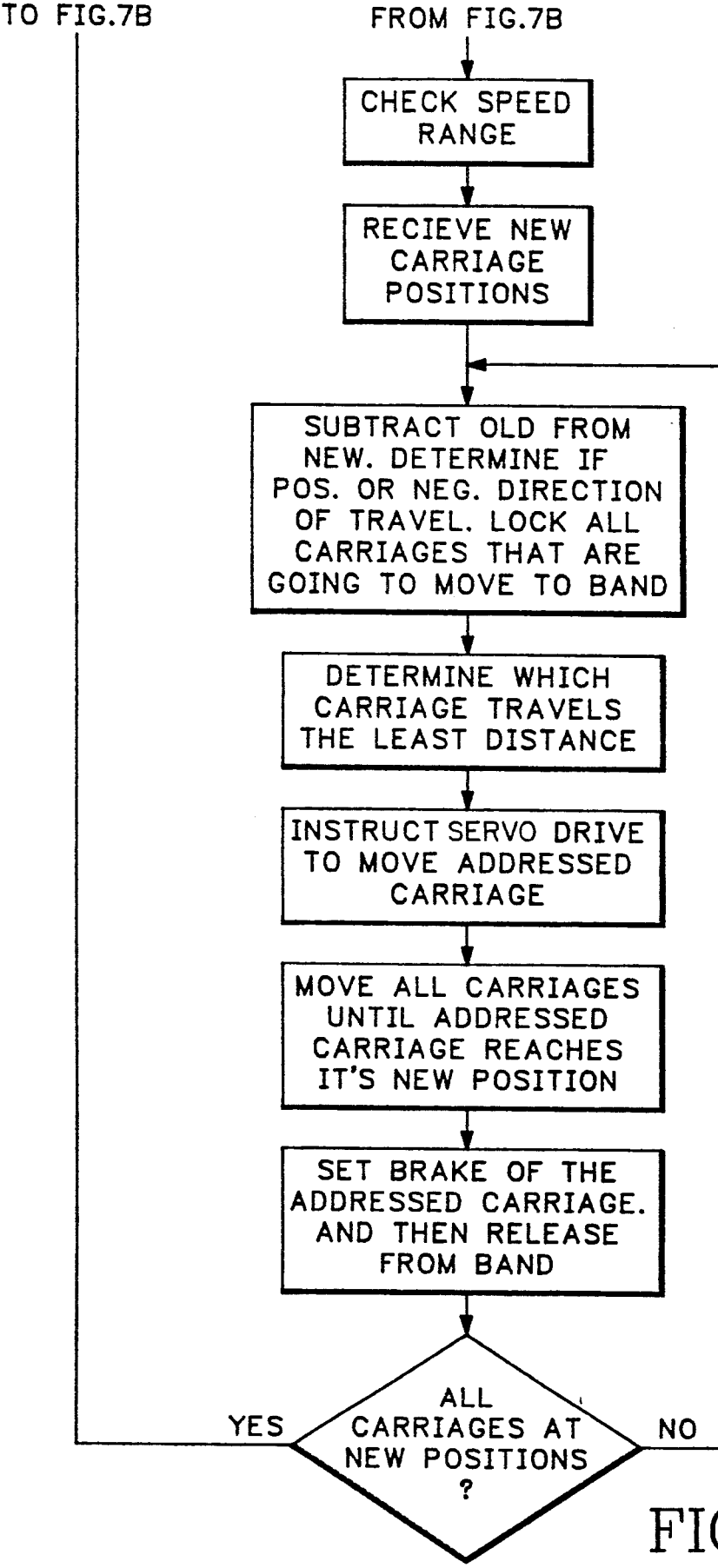

The controller 100 is programmed to control the positions of the respective carriages 32 generally in accordance with the logic flow diagram of FIGS. 7A, 7B and 7C. Upon energizing of the system, the controller causes the display 102a to indicate the existing positions of the respective carriages, both graphically and numerically. This position information is immediately available to the operator without any necessity for the carriages to be moved to a reference position since the position sensors 54 do not depend on the storage of a pulse count to indicate position. Rather each position sensor 54 transmits a discrete signal to the controller representative of the absolute position of its particular carriage, permitting the controller immediately to indicate the respective carriage positions on the display. This saves considerable time not only when initially starting the system but also when resuming operation after a temporary power failure. In the absence of any operator command from the terminal 102 requesting the initiation of a repositioning operation, the controller continues to transmit display signals indicating the current position of each carriage 32. However, upon its receipt of a repositioning command, the controller prepares to reposition the carriages either in accordance with a predetermined set of positions stored in its memory and accessed by the operator's entry of a corresponding program number, or pursuant to the operator's entry of detailed information regarding the number of active knives and the desired new web widths. The controller then causes the display 102a to indicate the intended new positions of the carriages, and checks whether the new positions are compatible with the capabilities of the equipment being controlled to insure that physically-impossible positions of the tools are not commanded. If the new positions are compatible with the equipment, the operator indicates on the terminal 102 whether or not it is desired that the new positions be saved in memory and, if so, the operator assigns a program number to the new information and it is stored. Thereafter the operator indicates whether or not the upper knives should be lifted while repositioning them. This need not necessarily occur if there is no web between the knives or if it is desired to reposition the knives without disengaging them from a moving web, the latter being feasible because of the high positioning speed and accuracy of the carriage positioning sequence employed as explained hereafter. Upon the operator's actuation of a "go" switch, the controller 100 calculates the difference between the new position for each carriage and its current position to determine the respective distances and directions of travel required for each carriage to reach its new position. By its control of the respective solenoid valves operating the clutch and brake assemblies on each carriage, the controller deactivates the brake assemblies on each carriage which must move to a new position, and activates the particular upper or lower clutch assembly of each carriage which corresponds to the direction of movement required. The controller identifies the carriage (the addressed carriage or corresponding upper and lower pair of addressed carriages) required to move the least predetermined distance to attain its new position, and commands the motor 40 to move the drive band 36 such predetermined distance. During such movement the controller monitors signals from the rotary encoder 104 associated with the motor 40 or its band, and compares such signals to the distance command signal until the compared signals are equal. When the compared signals are equal, the motor 40 is stopped, the brake assemblies of the addressed carriage are activated, and its activated clutch assembly is deactivated. Meanwhile, all of the other carriages which must likewise move to new positions have been moving simultaneously with the addressed carriage in respective directions toward their new positions. However, upon stoppage of the motor 40, their activated clutch assemblies remain activated. At this point, the controller reads all of the position sensors 54, recalculates the respective distances and directions of travel remaining for each carriage to reach its new position, and repeats the foregoing positioning process. If the previous addressed carriage has been properly positioned, no further travel distance for such carriage will be indicated, and the controller 100 therefore determines which of the remaining carriages corresponds to the least distance required to reach its new position and designates that carriage as the next addressed carriage, repeating the previous positioning operation with respect thereto. Alternatively, if the previous addressed carriage has not been properly positioned, its position sensor will indicate that further travel is required, and it will be moved further accordingly. The foregoing positioning operation recycles repeatedly until all carriages are properly positioned.

One advantage of the foregoing sequential "addressing" of carriages for positioning purposes, in the order of least distance to be traveled, is the further minimizing of wasted motion beyond that provided by the simultaneous bidirectional movement of the carriages. Another advantage is that the functions of the controller are simplified, thereby increasing the reliability of the system, by the ability to focus only on a single addressed carriage at any one time to compare commanded distance or position signals with corresponding feedback signals. Moreover, the order of positioning according to the distance to be traveled simplifies, and thus makes more reliable, the controller's function of ensuring that no moving carriage collides with an already-positioned and braked carriage. In the unlikely event that such collision occurs due to some malfunction in the system, the impact of the collision is cushioned, to prevent damage, both by the resilient drive carriage spring 46 and the fact that the clutch assemblies are permitted to slip with respect to the drive band 36 in response to abnormally high force resisting carriage movement.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of moving a plurality of tool-holding carriages to respective predetermined positions along an elongate guide member comprising:
   (a) calculating the respective distances which said carriages must move in order to reach their respective predetermined positions;
   (b) determining, from the respective distances calculated in step (a), the particular one of said carriages which corresponds to the least of said respective distances;
   (c) moving at least some of said carriages toward their respective predetermined positions simultaneously in opposite directions along said guide member;
   (d) positioning said particular one of said carriages at its respective predetermined position by comparing its actual position to its respective predetermined position during step (c), and locking said particular one of said carriages to said guide member when said particular one of said carriages reaches its respective predetermined position; and
   (e) repeating steps (b) and (c) with respect to the remaining carriages, and repeating step (d) with respect to each of the remaining carriages one at a time serially in a sequence of said remaining carriages corresponding to progressively larger ones of said respective distances.

* * * * *